Sept. 9, 1969   E. R. POLK ET AL   3,466,214
METHOD AND APPARATUS FOR TREATING AND COVERING AN INSERT WITH
THERMOPLASTIC MATERIAL
Filed Aug. 4, 1965   2 Sheets-Sheet 1
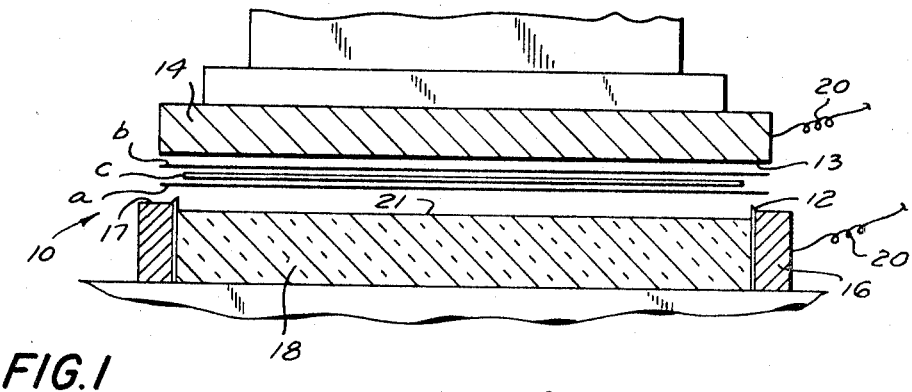
FIG.1
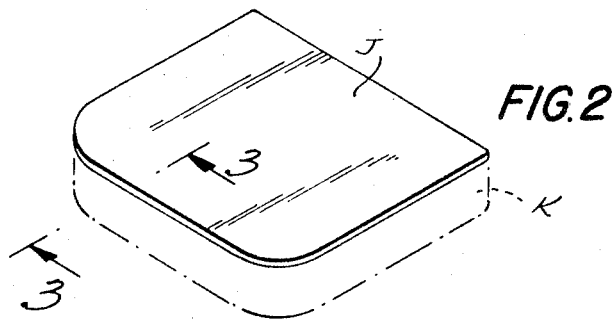
FIG.2
FIG.3
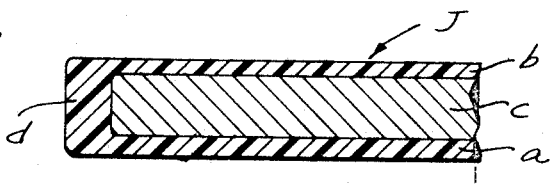
FIG.4
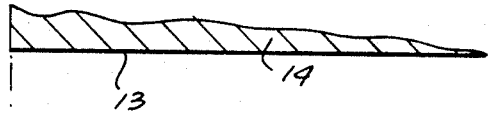
INVENTORS:
EDGWIN R. POLK
ANTONIO LA GRASSA
BY
ATTORNEYS Sept. 9, 1969  E. R. POLK ET AL  3,466,214
METHOD AND APPARATUS FOR TREATING AND COVERING AN INSERT WITH
THERMOPLASTIC MATERIAL
Filed Aug. 4, 1965  2 Sheets-Sheet 2
FIG.5
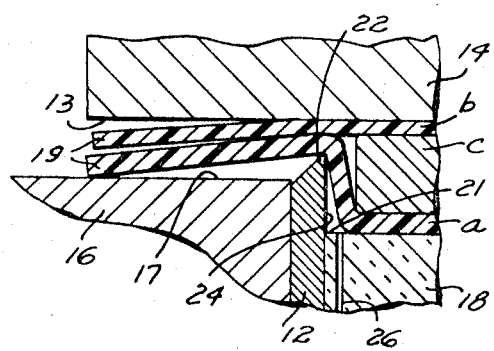
FIG.6
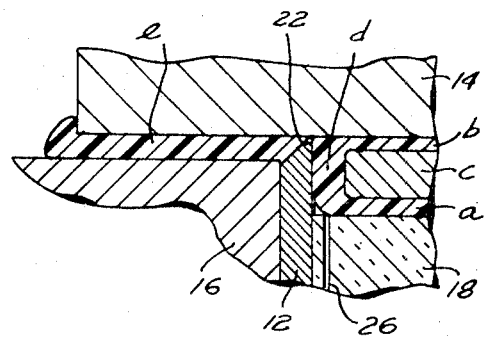
FIG.7
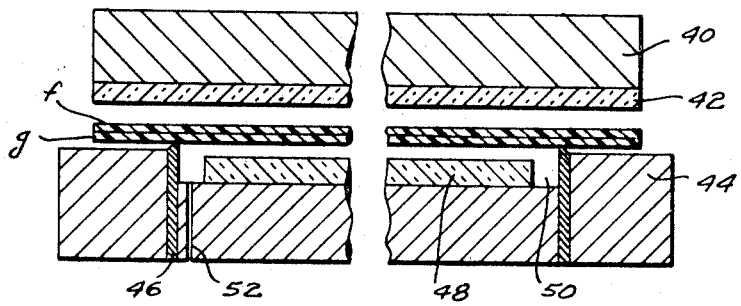
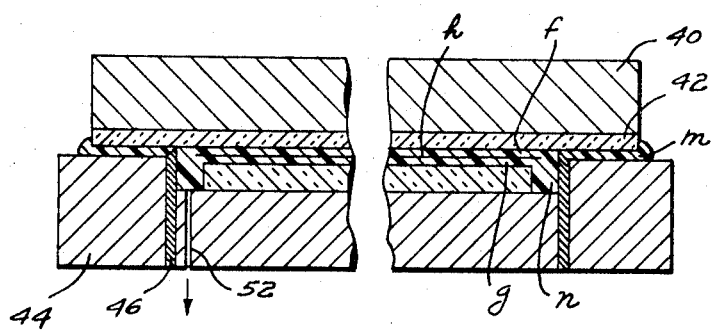
FIG.8
INVENTORS:
EDGWIN R. POLK
ANTONIO LA GRASSA
BY Breitenfeld & Levine
ATTORNEYS

United States Patent Office 3,466,214
Patented Sept. 9, 1969

3,466,214
METHOD AND APPARATUS FOR TREATING AND COVERING AN INSERT WITH THERMOPLASTIC MATERIAL
Edgwin R. Polk and Antonio La Grassa, Fords, N.J., assignors to Keene Packaging Associates, Elizabeth, N.J., a corporation of New Jersey
Filed Aug. 4, 1965, Ser. No. 477,148
Int. Cl. B32b 31/18; B29d 3/02
U.S. Cl. 156—213                11 Claims

ABSTRACT OF THE DISCLOSURE

An apparatus and method for treating thermoplastic sheet material. A tool and die apparatus provided with heating means is arranged to accommodate thermoplastic sheet material with or without an insert therebetween and, by heating and cutting, form thermoplastic members conforming to the contour of the die.

---

This invention relates to the treatment of thermoplastic sheet material, and deals primarily with the formation of relatively rigid walls comprising a stiffener or insert enclosed within thermoplastic sheet material.

Walls of this type find their primary usefulness as components of containers, such as cases for small electrical appliances and luggage cases. The walls are conventionally made by sandwiching the insert between a pair of thermoplastic sheets, the margins of which project beyond the periphery of the insert. The margins of the sheets are pressed against each other and heated along an endless line in order to fuse them together and enclose the insert. The sheets are cut near the outer edge of the fused area in order to trim away the excess sheet material.

A wall formed in the manner described above has several disadvantages. In the first place, the cutting operation leaves the wall with a sharp edge which is both unattractive and unfriendly to the touch. Secondly, since the dies which perform the fusing operation cannot be brought immediately adjacent to the insert, the periphery of the insert is spaced from the fused seam between the two thermoplastic sheets. Consequently, the thermoplastic sheets are loosely fitted over the insert permitting the sheets to ripple and crease. Thirdly, since it is desirable to have the edges of the sheets terminate as close to the periphery of the insert as possible, the tendency is to make the fused area between the sheets as narrow as possible, thus leading to weakness of the seam.

It is an object of the present invention to provide a method and apparatus for enclosing a stiffener or insert within a pair of plastic sheets which are fused together directly adjacent to the periphery of the insert so that the sheets cover the insert tightly in a gap-free manner.

It is another object of the invention to provide such a method and apparatus for producing a thermoplastic structure having a smooth unattenuated edge.

It is a further object of the invention to provide such a method and apparatus for producing a structure of the type described in which the seam between the two thermoplastic sheets is far stronger than conventional seams.

An additional object of the present invention is the provision of an apparatus which can be operated in the same way as a conventional apparatus but which, because of its novel structure, enables the plastic sheet material to conform closely to the configuration of the insert while being free of any sharp exterior edges.

Still another object of the invention is the provision of an article having the features and advantages described above.

According to the present invention, a cutting die having an upwardly directed cutting edge of some predetermined configuration is provided with an inner side surface which defines a region within it. A platen, arranged above the cutting die, is so dimensioned that its margin extends beyond the contour of the cutting edge. The platen and cutting die are relatively moveable toward and away from each other. During movement of the cutting die and platen toward each other thermoplastic sheet material situated between them and having margins extending beyond the cutting edge will be at least partly cut through as the distance between the cutting edge of the cutting die and the platen diminishes. In accordance with a particular feature of the present invention a heating member surrounds the cutting die and presents a face opposing the margin of the platen. The margins of the thermoplastic sheet material are heated and compressed between the heating means and the platen to an extent sufficient to provide a flow of molten thermoplastic sheet material inwardly beyond the cutting edge into the region defined by the inner side surface of the cutting die.

The invention is illustrated by way of example in the accompanying drawings, in which:

FIG. 1 is a sectional schematic view illustrating a platen, cutting die, and heating member according to the present invention, and schematically showing a pair of thermoplastic sheets and a cardboard insert in position for treatment;

FIG. 2 is a perspective illustration of a flat wall according to the present invention showing in dot-dash lines a side wall adapted to be joined with the flat wall for forming part of a container;

FIG. 3 is a fragmentary sectional view on an enlarged scale taken on line 3—3 of FIG. 2;

FIG. 4 is a fragmentary sectional elevation showing on an enlarged scale the structure at one side of the arrangement of FIG. 1;

FIG. 5 shows the structure of FIG. 4 at a stage of the operation subsequent to that of FIG. 4;

FIG. 6 illustrates the structure of FIGS. 4 and 5 at a still further stage in the sequence of operations;

FIG. 7 is a schematic sectional view of another embodiment of an apparatus according to the present invention for making a different type of article according to the present invention; and FIG. 8 shows the structure of FIG. 7 at a subsequent point in its operation.

Referring to FIG. 1, an apparatus 10 is shown including a cutting die 12 having an upwardly facing endless cutting edge contoured to conform to the line of predetermined configuration along which the thermoplastic sheet material is to be subsequently trimmed. Arranged over the cutting die 12 is a platen 14 which in a well known manner is capable of being lowered toward and raised away from the cutting die 12. The margin 13 of the platen extends beyond the contour of the cutting die 12. The cutting die 12 is surrounded by a heating member 16 which contacts the cutting die along its entire periphery. The heating member 16 presents a face 17 in opposed relation to the flat lower face of the margin 13 of platen 14. Situated within and surrounded by the cutting die 12 is an insulator 18 made, for example, of a fibrous material so that it will provide good electrical and thermal insulation. A pair of conductors 20 are electrically connected to the heating member 16 and the platen 14, respectively, and serve to connect the heating member and platen to a source of high frequency current. In well known manner, such a connection is capable of generating heat sufficient to melt thermoplastic material between the heating member 16 and the margin 13 of the platen.

In order to carry out the process of the present invention so as to make a flat wall as shown in FIGS. 2 and 3, the operator places an insert c, which may be in the form of a cardboard sheet of a predetermined configuration, between a pair of thermoplastic sheets a and b whose margins extend beyond the outer periphery of the insert c. The configuration of the cutting die 12 conforms to but is somewhat larger than the configuration of the periphery of the insert c so that when the latter is placed within the space surrounded by the cutting die a continuous groove will be defined between the inner side surface of the cutting die 12 and the outer periphery of the insert c. With the pair of thermoplastic sheets a and b and the insert c arranged as schematically indicated in FIG. 1, the platen 14 is lowered toward the cutting die 12, to produce an article as shown in FIGS. 2 and 3.

In the present example, the article J is a flat wall which may be joined in any well known manner to a side wall K which extends along the entire periphery of the wall J and projects substantially perpendicularly to it. The wall K may itself be formed as an elongated flat strip by means of the present invention, and then bent into a continuous loop by permanently joining its two shorter sides. The walls J and K together form a tray-like component which can be hinged, along one free edge of the wall K, to another identical component to form a container. As may be seen clearly in FIG. 3, the article of the present invention has a plastic covering formed by the portions of the sheets a and b which engage the opposed faces of the insert c and by the peripheral portion d at which location the sheets a and b are fused to each other. It should be noted that the peripheral portion d directly engages and precisely conforms to the configuration of the peripheral edge of the insert c so that the article of the present invention has absolutely no gaps between the periphery of the insert c and the peripheral plastic portion d where the sheets a and b are fused to each other. Also, it is to be noted that the peripheral portion d is squared-off and smooth so that there is no disagreeable sharp edge. This is in contrast to conventional structures in which there is a very decided gap between the line along which the covering sheets are joined to each other and the outer periphery of the insert.

The process of the present invention is shown in detail in FIGS. 4–6. Referring to FIG. 4, it will be seen that initially the insert c, sandwiched between the thermoplastic sheets a and b, is set into the space surrounded by the cutting die 12 so that the sheet a rests directly on the exposed face of the insulator 18. The insert c rests on the sheet b and the sheet b rests on the insert c. The margins 19 of the sheets a and b extend beyond the cutting die 12 and between the face 17 of member 16 and the margin 13 of platen 14. The upwardly directed cutting edge 22 of the cutting die is located closest to the platen 14. The upper face 17 of the heating member 16 is spaced from the plane containing the cutting edge 22 a distance less than the combined thickness of the thermoplastic sheets a and b, and the exposed face 21 of the insulator 18 is spaced below the plane containing the cutting edge 22 a distance slightly less than the combined thickness of the sheets a and b and the insert c.

With the parts positioned as indicated in FIG. 4 the operating cycle can commence. The platen 14 is lowered in one continuous motion through and beyond the position of the parts shown in FIG. 5. At the position shown in FIG. 5, the cutting edge 22 of the die starts to cut into the lower thermoplastic sheet a while pressing the latter upwardly against the sheet b and also pressing the sheet b against the undersurface of the platen 14. The significance of the action shown in FIG. 5 is that the space between the upper surface of the insulator 18 and the lower surface of the platen 14 is completely filled at this time by the pair of thermoplastic sheets and the insert, so that during the continued downward movement of the platen 14 the insert c and the thermoplastic sheets a and b will be compressed slightly between the platen 14 and the insulator 18. Consequently, no molten plastic can flow to the right (in FIGS. 4–6) of the peripheral edge of the insert c.

The platen 14 continues to move downwardly from the position shown in FIG. 5 until it reaches the position shown in FIG. 6. During this final stage of operation, the platen 14 and member 16 are provided with high frequency current. Consequently, the margins 19 of the pair of thermoplastic sheets a and b are simultaneously compressed and heated between the member 16 and the margin 13 of the platen 14 to produce a molten body of plastic e indicated in FIG. 6. The compression of the molten plastic e results in a flow of this plastic material inwardly beyond the cutting edge 22 of the die 12 into the space defined by the inner side surface 24 of the die. In this way, the flowing molten plastic forms the peripheral plastic region d, indicated in FIGS. 3 and 6, at which the thermoplastic sheets a and b are fused to each other. Some of the molten plastic flows outwardly beyond the edge of the platen.

Because of the thermoplastic material which forms the outer periphery d of the final article is initially in a molten condition it will conform perfectly to the outer periphery of the insert c. Thus, the thermoplastic covering fits tightly over the insert c. The thickness of the thermoplastic sheets is preferably chosen so that the space between the outer periphery of the insert c and the inner side surface 24 of the cutting die will be filled with plastic approximately as indicated in FIG. 6, thus providing the article with a side edge which conforms to the contour of the surface 24. To aid the flow of plastic into the space between the surface 24 and insert c, the space may be partially evacuated. For this purpose, the insulator 18 may be formed with a bore 26 which communicates with a suitable vacuum pump or the like (not shown). However, even if the molten plastic does not completely fill the space mentioned above, the benefits of the present invention will still be achieved.

When the platen 14 is raised from the cutting die 12, the thermoplastic sheets and insert can be removed from the apparatus. It will be found that the cutting edge 22 has not cut completely through the plastic material. Instead flash e still remains connected with the edge d by means of an extremely thin bridge of plastic having the configuration of the cutting edge 22. The machine operator can readily remove the flash e along this bridge or score line leaving the article J with a perfectly smooth outer peripheral edge.

As an example of the dimensions of the article and structure of this invention, the cardboard insert c may have a thickness of from $\frac{1}{32}$ to $\frac{1}{16}$ inch, and the thermoplastic sheets may have a thickness of from 0.012 to 0.015 inch. The plane containing the cutting edge 22 can be spaced from the face 17 about .008 inch, and the margin 13 of platen 14 may extend ¼ inch beyond the cutting die 12. The plastic sheets may be made of any conventional thermoplastic material such as a vinyl, polyethylene, or polystyrene. The insulator 18 may be made of plexiglass, or any other readily available insulating material.

If such thin plastic sheets should be used that there is insufficient plastic to fill the space between the insert c and the surface 24 to the desired extent, the flash e, resulting from the previous operation, can initially be placed over the face 17 of member 16 so as to contribute to the available material for filling this space.

FIGS. 7 and 8 illustrate a somewhat different embodiment of this invention. In this embodiment, the insert c is dispensed with. Therefore, FIG. 7 and 8 show a pair of thermoplastic sheets f and g which directly engage each other without any insert between them. The platen 40, which corresponds in all respects to the platen 14, is provided in this case with an optical layer of insulation 42. The heating member 44 and cutting die 46 are identical to member 16 and die 12. An insulator 48 within the die 46 is smaller than the insulator 18, and thus defines with the cutting die a groove 50. An evacuating bore 52 may be provided if desired. With this construction, when the platen is lowered to the position indicated in FIG. 8 and the heating means is actuated, the margins of the plastic material become molten in the region $m$ and the plastic flows inwardly beyond the cutting die 46 into the groove 50 to form a plastic article having flanges $n$ at which the sheets $f$ and $g$ are fused to each other. Between the flanges $n$, the sheets engage each other at the interface $h$. In this way a plastic article can be made from the pair of sheets $f$ and $g$ which may have different appearances. As a result, one side of the article will have one appearance and the other side will have a different appearance. The flanges $n$ will conform closely to the configuration of the groove 50. If desired, a single plastic sheet can be used instead of a pair of plastic sheets, in which case the article will have the same appearance on both faces.

The features described in connection with FIGS. 7 and 8 can be provided with the embodiment of FIGS. 1–6. Thus, the platen 14 can, if desired, be provided with an insulator 42, and the insulator 18 can be made smaller than the die 12 so that the article J is formed with a flange similar to flange $n$.

In the drawings, the cutting die 12 and heating member 16 are shown as two separate parts. However, it should be noted that the die and heating member may be formed as a single integral element. Furthermore, although the inner face 24 of the die 12 is shown as a planar surface perpendicular to the insulator 18, the face 24 may have any desired shape and orientation dependent upon the desired shape of the edge of the finished wall produced by the apparatus.

What is claimed is:

1. An apparatus for treating thermoplastic sheet material, comprising a cutting die having an endless cutting edge defining a region within it, a platen in opposed relation to said cutting die means and so dimensioned that its margin extends beyond the contour of said cutting edge, said cutting die and platen being relatively moveable toward each other so that thermoplastic sheet material placed between them and having margins extending beyond said cutting edge will be squeezed between said platen and cutting edge, a heating member surrounding said cutting die and having a face opposing the margin of said platen, the margin of the thermoplastic sheet material being squeezed between said heating member and the margin of said platen when the latter and said cutting edge move into close proximity, and means for heating said heating member and the margin of said platen to cause the margin of the thermoplastic material to melt and flow, due to its being compressed, over said cutting edge and into said region.

2. An apparatus as defined in claim 1 wherein the plane containing the face of said heating member is spaced from the plane containing said cutting edge by a distance less than the thickness of the thermoplastic sheet material placed between said platen and said cutting die, in order to insure that the thermoplastic will be squeezed between said face and said platen.

3. An apparatus as defined in claim 1 including an insulator within said cutting die, the exposed face of said insulator being spaced from the plane containing said cutting edge a distance less than the thickness of the sheet material located between the insulator and said platen, whereby some pressure is applied to the sheet material located within said cutting die.

4. An apparatus as defined in claim 1 including means for evacuating said region in order to facilitate the flow of molten plastic into it.

5. An apparatus as defined in claim 1 wherein said platen and heating member constitute electrodes, and said heating means constitutes a means for applying a high frequency current to said electrodes.

6. An apparatus as defined in claim 1 wherein said cutting die has an inner face, and including an insulator within said cutting die, the edge of said insulator being spaced from said inner face, to define a groove between them, whereby flow of molten plastic material over said cutting edge fills said groove and provides a flange on the resulting product having a cross-sectional configuration corresponding to said groove.

7. An apparatus for covering an insert with thermoplastic sheet material, comprising a cutting die having a configuration corresponding to and slightly larger than the outer periphery of the insert so that the latter can be surrounded by said cutting die means while spaced therefrom so as to define between the outer periphery of the insert and an inner side surface of the cutting die means an elongated groove extending along the outer periphery of the insert, a platen in opposed relation to said cutting die and so dimensioned that its margin extends beyond the contour of said cutting edge, said cutting die and platen being relatively movable so that when an insert sandwiched between a pair of thermoplastic sheets is placed between said cutting die and platen, and said thermoplastic sheets have margins extending beyond said cutting edge, the thermoplastic sheets will be squeezed between them, and a heating member surrounding said cutting die and having a face opposing the margin of said platen, and means for heating said heating member and the margin of said platen so that the margins of the pair of thermoplastic sheets are simultaneously heated and compressed to cause thermoplastic material of the sheets to flow inwardly beyond said cutting die means into the groove surrounding the periphery of said insert.

8. A method for covering an insert with thermoplastic material, comprising the steps of sandwiching the insert between a pair of thermoplastic sheets whose margins extend beyond the periphery of the insert, partially cutting through the thermoplastic sheets along an endless line spaced from the periphery of the insert, simultaneously heating and compressing the portion of the thermoplastic sheets extending outside the cutting line to cause said portion to melt and flow into the space between the periphery of the insert and the cutting line.

9. The method of claim 8 including the further step of generating a pressure to force molten thermoplastic material from outside the cutting edge into the space between the periphery of the insert and the cutting line.

10. The method of claim 9 wherein the pressure used to force the molten thermoplastic material from outside the cutting edge into the space between the periphery of the insert and the cutting line is a vacuum pressure applied to said space.

11. A method for making an insulating wall member for use in a container comprising the steps of:
placing an insert member on a first sheet of thermoplastic material which sheet has margins which extend beyond the periphery of the insert;
placing on the insert member a second sheet of thermoplastic material, which sheet has margins which extend beyond the periphery of the insert;
placing the composite assembly of the first and second thermoplastic sheets and the insert on a support having a centrally disposed insulator surface, a peripherally disposed cutting die and a lower heating member arranged around the cutting die so that the portion of the first thermoplastic sheet on which the insert member rests is in direct contact with the insulator surface, a continuous section of the margin of the thermoplastic sheets extending beyond the periphery of the insert rests on the cutting die, the portion of the margin of the thermoplastic sheets extending beyond the cutting die rests on the lower heating member and a peripheral space is provided between the insert and the cutting die;

pressing an upper heating member against the thermoplastic sheets to a location wherein the plane containing the face of the second heating member is spaced from the plane containing the cutting edge of the cutting die a distance less than the thickness of the thermoplastic material;

energizing the heating members to melt the portion of the thermoplastic sheets which extends beyond the cutting die; and drawing the molten thermoplastic material into the space between the periphery of the insert and the cutting die.

References Cited

UNITED STATES PATENTS 2,953,814   9/1960   Mumford _____ 264—163 XR

ROBERT F. BURNETT, Primary Examiner

WILLIAM A. POWELL, Assistant Examiner

U.S. Cl. X.R.

161—43, 149; 264—163, 248, 249, 101; 18—19; 156—222, 251, 267, 272, 285, 306, 380, 382, 383, 475, 515, 228